(12) United States Patent
Ellis et al.

(10) Patent No.: US 7,112,783 B2
(45) Date of Patent: Sep. 26, 2006

(54) NEUTRON MEASUREMENT METHOD FOR DETERMINING POROSITY OF A FORMATION SURROUNDING A BOREHOLE

(75) Inventors: Darwin Ellis, Ridgefield, CT (US); Benoit Couet, Weston, CT (US); Michael Evans, Missouri City, TX (US); Charles R. Case, West Redding, CT (US); Françoise Allioli, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 345 days.

(21) Appl. No.: 10/657,391

(22) Filed: Sep. 8, 2003

(65) Prior Publication Data

US 2005/0051718 A1    Mar. 10, 2005

(51) Int. Cl.
*G01V 5/10* (2006.01)

(52) U.S. Cl. .............................. 250/269.4; 250/269.6; 250/269.7

(58) Field of Classification Search ............ 250/269.4, 250/269.6, 269.7
See application file for complete search history.

(56) References Cited

U.S. PATENT DOCUMENTS

| 4,910,397 A | * | 3/1990 | Mills et al. ................. 250/264 |
| 5,767,510 A | * | 6/1998 | Evans ..................... 250/269.1 |
| 6,207,953 B1 | * | 3/2001 | Wilson .................... 250/269.4 |

* cited by examiner

*Primary Examiner*—David Porta
*Assistant Examiner*—Mindy Vu
(74) *Attorney, Agent, or Firm*—Victor H. Segura; Brigitte L. Echols

(57) ABSTRACT

The invention concerns a neutron measurement method for determining porosity of an earth formation surrounding a borehole comprising:
  conveying a tool along said borehole, wherein said tool comprises a source of neutron radiation and at least one detector axially spaced from said source;
  generating measured detector response for said at least one detector that is indicative of neutron radiation from said source interacting with said earth formations;
  operating said measured detector response with a predetermined mathematical equation and thereby obtaining corrected detector response that is independent of the density of said earth formation; and
  determining porosity of the earth formation surrounding the borehole from said corrected detector response.

The invention also relates to a system implementing said method.

36 Claims, 2 Drawing Sheets

NEUTRON MEASUREMENT METHOD FOR DETERMINING POROSITY OF A FORMATION SURROUNDING A BOREHOLE

BACKGROUND OF THE INVENTION

This invention relates to the determination of a characteristic of earth formations penetrated by a borehole, and more particularly to the determination of formation porosity through neutron measurements.

In hydrocarbon exploration and production, it is of prime importance to determine (a) if a given earth formation contains hydrocarbon, (b) the amount of hydrocarbon within the formation, and (c) the producibility of the hydrocarbon in place within the formation. The amount of hydrocarbon present within a formation is a function of the pore space or the "porosity" of the formation. In drilling wells for the production of hydrocarbons, it is desirable to measure the porosity of each prospective hydrocarbon producing formation penetrated by the borehole. It is even more desirable, for economic and prospective reasons to determine the porosity of prospective formations during the actual drilling of the borehole.

Over the past decades, many technologies have been used to measure or estimate formation porosity from a borehole. One of these technologies is based on a system that contains an isotopic source that emits fast neutrons, and an axially spaced detector that responds to the flux of impinging thermal neutrons resulting from the interaction of fast neutrons with nuclei within the borehole and formation in the vicinity of the borehole. The basic concept of this system is predicated on the fact that (a) hydrogen is the most effective moderator of fast neutrons because of its low atomic weight, and (b) most hydrogen found in earth formations is contained in liquid in the pore space of the formation, either as water or as liquid hydrocarbon or gas. The detector is axially spaced from the neutron source such that for a given borehole condition, the count rate recorded by the thermal neutron detector decreases as the volumetric concentration of hydrogen, or porosity increases.

Dual detector neutron porosity systems have been introduced to minimize the effects of the borehole upon the measurement of formation porosity. U.S. Pat. No. 3,483,376 and U.S. Pat. No. 5,767,510 disclose two thermal neutron detectors that are spaced axially at different distances from the source of fast neutrons. The ratio of the responses of the two detectors varies with formation porosity, yet is less sensitive to borehole parameters than the count rate from either two individual detectors. The ratio is therefore the measured parameter used to compute porosity. Historically, this ratio has been formed from the response of the detector closest to the source, or the "near" detector, divided by the response of the detector farthest from the source, or the "far" detector.

However, accuracy problems remain with these two detectors systems since the response of said neutron porosity tool significantly varies with the density of the formation to be logged. Furthermore, this response is also a function of the thermal capture cross section (sigma). Minimizing the sigma response of a neutron porosity measurement is usually achieved by enclosing the neutron detectors in a highly absorbing thermal neutron shield through which only epithermal neutrons may penetrate. In that way, only epithermal neutrons are detected, resulting in very little sigma response.

Careful positioning of detectors with respect to the source can minimize density effects. It has been shown that a minimum in density response occurs at a certain unique distance from the source depending on the source energy (see Scott, H. D., et al., 1994, "Response of a Multidetector Pulsed Neutron Porosity Tool", paper J, in 35$^{th}$ Annual Logging Symposium Transactions of the Society of Professional Well Log Analysts). Detectors placed at the point of minimum density sensitivity have been shown to have very little density response.

However, this technique has various drawbacks, among which is a strong restriction on the placement of the detectors, which in turns, leads to important mechanical constraints. Furthermore, the far detector still displays significant density sensitivity.

SUMMARY OF THE INVENTION

It is thus an object of the invention to propose a method for determining porosity of a formation surrounding a borehole providing design flexibility while greatly improving the dynamic range of the neutron porosity measurement; minimizing environmental corrections and eliminating differences in shale response among various tool designs.

In order to achieve this goal, a neutron measurement method is proposed for determining porosity of an earth formation surrounding a borehole comprising:
  conveying a tool along said borehole, wherein said tool comprises a source of neutron radiation and at least one detector axially spaced from said source;
  generating measured detector response for said at least one detector that is indicative of neutron radiation from said source interacting with said earth formations;
  operating said measured detector response with a predetermined mathematical equation and thereby obtaining corrected detector response that is independent of the density of said earth formation; and
  determining porosity of the earth formation surrounding the borehole from said corrected detector response.

Preferably, the predetermined mathematical equation comprises multiplying the measured detector response by a correction factor that depends on the density of the formation. Advantageously, the measured and corrected near detector responses comprise a near detector count rate, said measured and corrected far detector responses comprise a far detector count rate.

Advantageously, said mathematical equation is of the form:

$$CR_{corr} = CR \times e^{\beta \rho},$$

wherein $CR_{corr}$ is the corrected detector response, CR is the measured detector response, $\beta$ is the detector sensitivity to density and $\rho$ is the formation density.

It is also an object of the invention to propose a system for determining porosity of an earth formation surrounding a borehole comprising:
  (a) a borehole tool comprising a source of neutron radiation and at least one detector; and
  (b) a computer for computing measured response of said detector thereby obtaining a measure of the porosity of the earth formation surrounding the borehole, whereby:
  said measured response from said at least one detector is indicative of nuclear radiation from said source interacting with said earth formation;
  said measured response of said detector is operated with a predetermined mathematical equation using said computer to obtain corrected detector response that is independent of the density of the formation; said corrected detector response being indicative of the porosity of the earth formation surrounding the borehole.

The advantage of these method and system is a more accurate neutron porosity measurement having desirable response characteristics. Moreover, this neutron measurement method applies to neutron porosity measurements made with various means of conveyance: wireline (WL), logging-while-drilling (LWD), or logging-while-tripping (LWT).

BRIEF DESCRIPTION OF THE DRAWINGS

Additional objects and advantages of the invention will become apparent to those skilled in the art upon reference to the detailed description taken in conjunction with the provided figures.

DESCRIPTION OF THE PREFERRED EMBODIMENTS

Figure 1:
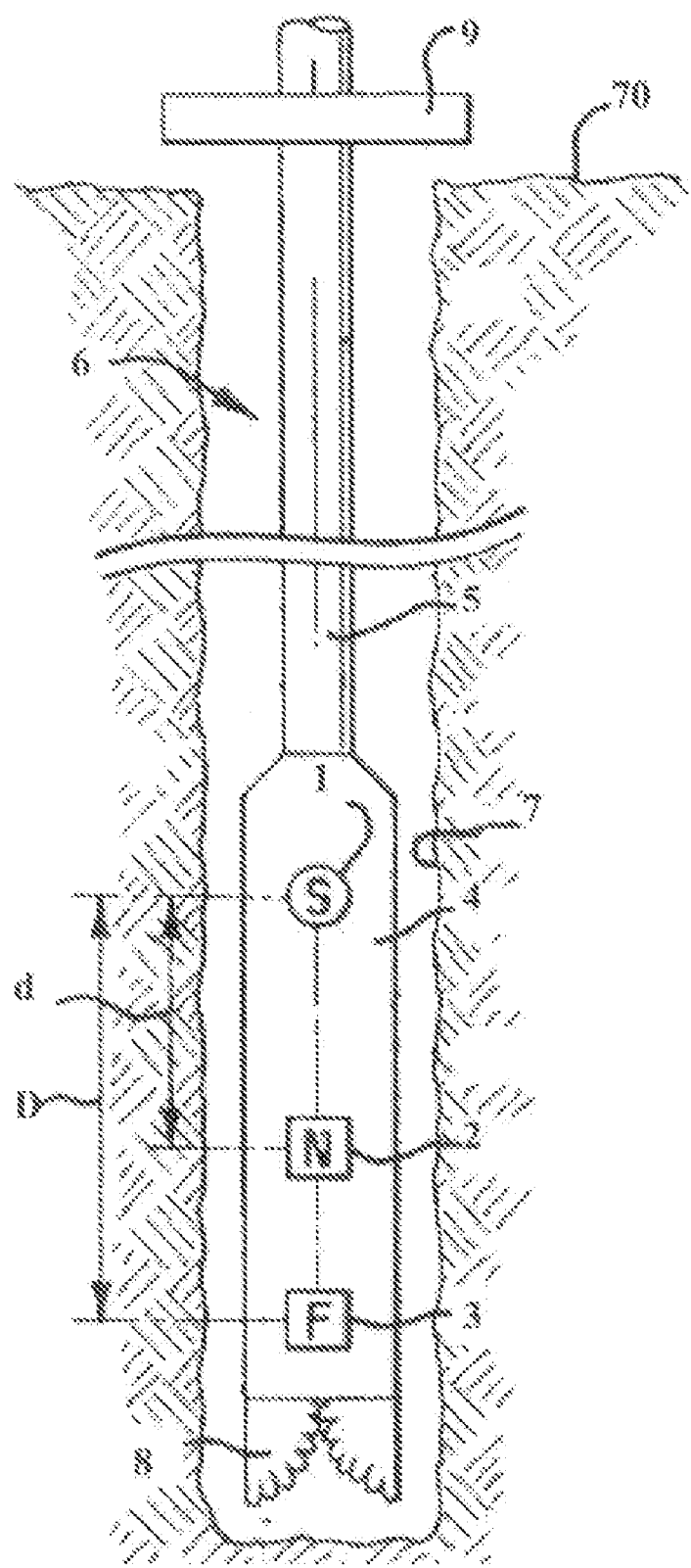
FIG. 1 shows a neutron porosity measurement tool.

FIG. 1 illustrates a detector neutron porosity device embodied as a logging-while-drilling tool. In this example of a system according to the invention, a source of fast neutrons 1, a near detector 2 and a far detector 3 are positioned within a drill collar 4, which will be referred to as the LWD tool. In another example of a method and system according to the invention, the tool can utilize more than two axially spaced detectors, thereby allowing single or pairs of detectors responses to be selected to optimize the limits of the prospected zone. The LWD tool 4 is suspended by means of a drill string 5 within a borehole 6 penetrating an earth formation 7. The upper end of the drill string 5 is suspended at the surface of the earth 70 preferably from conventional rotary drilling draw works (not shown). A drill bit 8 is affixed to the lower end of the LWD tool. The drill string 5 is rotated by means of a kelly 9 thereby rotating the LWD tool 4 and drill bit 8, and thereby extending the borehole downwardly as a result of the cutting action of the drill bit. A preferably conventional drilling fluid system is employed to remove cuttings formed by the rotating drill bit, and to maintain hydrostatic pressure within the borehole.

In the example of FIG. 1, the near detector 2 is axially spaced at distance d from the neutron source 1 and the far detector 3 is axially spaced at distance D from said neutron source. The neutron source, near and far detectors are pressure sealed, preferably within the wall of the tool 4, thereby isolating these elements from the borehole environment, and also allowing for a preferably coaxial channel within the tool 4 through which the drilling fluid flows. The drilling fluid exits the drill bit 8 in a manner well known in the art. The neutron source is preferably an isotopic source that emits fast neutrons. This could be a chemical source such as a mixture of Americium and Beryllium (Am—Be, 4.5 MeV), or alternately, Californium-252 ($^{252}$Cf). The neutron source could also be a neutron generator using a d-d or d-T reaction. The pulsed neutron generator consists of a high voltage supply (typically 70 to 100 kV) and a vacuum tube in which deuterium and tritium ions are first generated and then accelerated onto a target containing tritium and deuterium. The reaction between a deuteron and a tritium nucleus results in the emission of a neutron with an energy of about 14 MeV.

The near detector and the far detector are preferably sensitive only to very low energy neutrons, that is "thermal" or "epithermal" neutrons. Helium-3 detectors are responsive to both thermal and epithermal neutrons, while a Helium-3 detector wrapped with a layer of cadmium is responsive primarily to epithermal neutrons as is well known in the art. In the example where a ratio between the far detector and the near detector responses is implemented, it is preferred that the far detector 3 be more sensitive to thermal neutrons for statistical reasons, since the flux of thermal neutron at the position of the far detector will be considerably less than the thermal neutron flux at the near detector.

Due to the method of the invention, when a far and a near detectors are provided, the relative position of the far and near detectors can be varied with respect to the neutron source, which is very convenient since it allows mechanical adaptability. Referring to FIG. 1, the near and far spaced detectors can both be positioned above the neutron source at preferably axial spacings, respectively. Alternately, either the near or far spaced detector can be positioned above the neutron source, and the other detector (or both) can be positioned below the neutron source.

Power supplies and control and data conditioning circuitry for the detectors are contained preferably within the LWD tool 4. The counting rates of the near detector 2 and far detector 3 are preferably telemetred to the surface of the earth 70 by means of a mud pulse telemetry system, not shown, or other suitable telemetry system known in the LWD and MWD (Measurement While Drilling) art. Alternately, detector responses or the count rate data can be recorded and stored within a memory means (not shown), preferably located within the LWD tool 4, for subsequent retrieval when the LWD tool is returned to the surface of the earth 70, using a computer (not shown) to display the near and far count rates, subsequently creating a log of the porosity of the formation as a function of depth within the borehole.

In general, detector responses depend on both hydrogen index & density of the formation surrounding the borehole (assuming no sigma effects, where sigma is the neutron macroscopic capture cross section of the formation, see e.g. The book "*Well logging for Earth Scientists*", by Darwin Ellis (Elsevier)).

Then the count rate (CR) for a given detector can be expressed by:

$$CR \sim e^{-\alpha HI} \times e^{-\beta \rho} \qquad \text{eqn (1)}$$

Where: HI=formation hydrogen index, i.e. the hydrogen concentration of the formation relative to that of water.

ρ=formation density

α=detector sensitivity to HI

β=detector sensitivity to density and an exponential dependence on HI and density is assumed. The sensitivities α and β are constants for a given detector spacing and neutron source energy (in particular, β varies depending on chemical or neutron generator sources but with the appropriate coefficient, this differences can be overcome to attain accurate porosity measurements). The sensitivity β is determined for a given detector by observing the count rate response while varying the formation density but keeping the formation HI constant. The sensitivity β is obtained by doing the reverse operation.

Then the equation:

$$CR_{corr} = CR \times e^{\beta \rho} \sim e^{-\alpha HI}$$

removes the density effect and isolates the HI response. This equation can then be applied to at least a measured detector response or both to a near and a far detector count rates.

Thus, according to the invention, corrected detector count rates ($N_{CRcorr}$ and $F_{CRcorr}$ respectively) in the example wherein two detectors (near and far) are implemented can be obtained by:

$$N_{CRcorr} = N_{CR} \times e^{\beta near} \times \rho \sim e^{-\alpha nearHI}$$

$$F_{CRcorr} = F_{CR} \times e^{\beta far} \times \rho \sim e^{-\alpha farHI} \quad \text{eqn (2)}$$

wherein $N_{CR}$ and $F_{CR}$ are the measured near and far detector count rates respectively.

According to the method of the invention it is possible to use a single measured detector count rate and correcting it with said method in order to obtain, with an appropriate processing method known in the art, the formation porosity. It is also possible to use a pair of near and far detectors and then to use either both corrected near and far detector count rates or only one corrected count rate and a second measured count rate in order to obtain a count rate ratio. However, using both corrected near and far detector count rates will be preferred in order to obtain the most accurate formation porosity.

In the example where both near and far detector count rates are corrected, this will lead to the corrected ratio:

$$R = \frac{N_{CRcorr}}{F_{CRcorr}}.$$

This ratio is relatively insensitive to density and will respond only to hydrogen index. In particular, as represented on FIGS. 2a and 2b, readings in shales should not yield exaggerated porosities caused by density effects. That is, the apparent porosity of a 45 pu shale using the uncorrected ratio (FIG. 2a) is about 82 pu, whereas the density corrected ratio (FIG. 2b) yields the correct porosity of 45 pu.

Figure 2A:
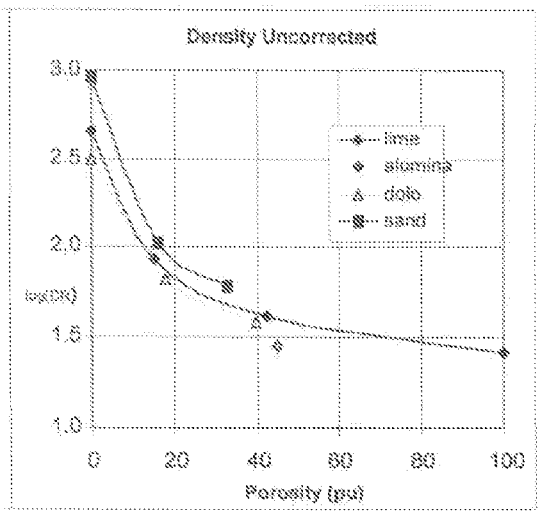
FIGS. 2a and 2b represent uncorrected and corrected count rates according to the method of the invention.
Figure 2B:
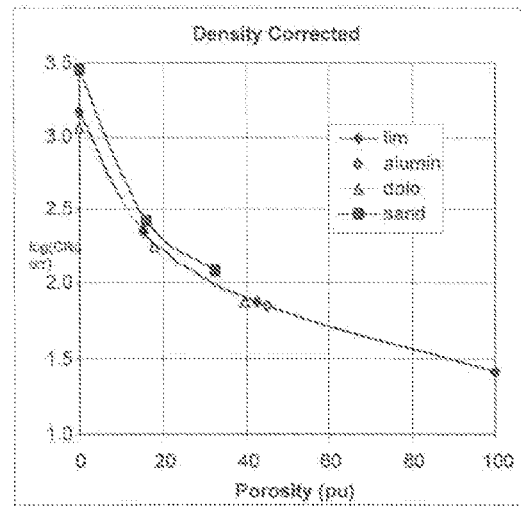

To further explain, FIG. 2a shows a far detector measured response prior to density correction. The deviations of the sandstone and dolomite points from the limestone porosity response are due primarily to density effects (especially for dolomite). The alumina point, representing a dense shale response and well separated from the limestone response line, displays even more density effects. In FIG. 2b the far detector count rates have been corrected for density effects, according to the calculation method of the invention. As a result, the dolomite and alumina points lie on the limestone response line, demonstrating that density effects have been removed. The sandstone points move closer to the limestone response line but do not overlay the limestone response due to residual effects having to do with fast neutron transport.

Figure 3A:
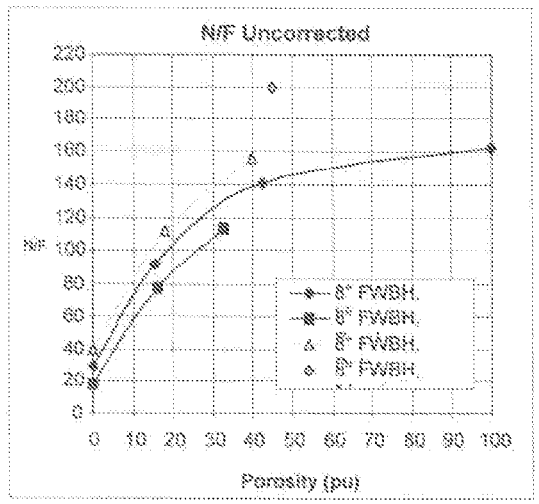
FIGS. 3a and 3b represent uncorrected and corrected near to far detector ratios according to the method of the invention.
Figure 3B:
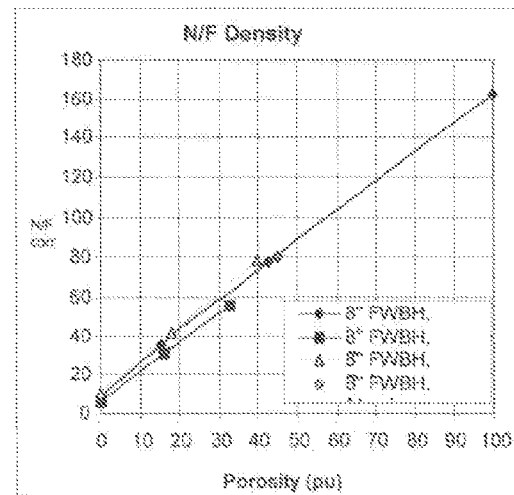

As represented in FIGS. 3a and 3b, the effects of density correction are even more apparent in terms of the ratio of near to far count rates. The uncorrected $N_{CR}/F_{CR}$ ratio (FIG. 3a) shows significant density effects for sandstone, dolomite and the alumina point compared with the limestone response (that is, the sandstone, dolomite and shale points lie well away from the limestone porosity response line). On the other hand, the density-corrected ratio $$R = \frac{N_{CRcorr}}{F_{CRcorr}}$$

is insensitive to density effects and will respond only to hydrogen index HI. As a result, the dolomite and shales points lie on the limestone response line (the sandstone responses are much closer to the limestone response line but exhibit residual effects).

Applying the density correction to the detector count rates has several benefits. First, the dolomite and alumina points lie on the limestone response line and thus will need no lithology correction, that is, the porosity response in limestone, dolomites and shales is very nearly identical. Secondly, the sandstone points lie closer to the limestone response line and hence will require a smaller lithology correction to place them on the reference limestone response line. Thirdly, and most importantly, the dynamic range of the measurements has been dramatically improved, especially at the higher porosities, by removing the density effects. That is to say, the dynamic range (0→100 pu) is about 5 for the uncorrected ratio and about 20 for the density-corrected ratio. Better dynamic range results in a more accurate and statistically precise porosity measurement.

The method of the invention can be applied to an existing LWD tool design to "tune" the porosity response of the tool so that it exhibits a specified amount of density effect. The amount of density effect exhibited by a given design is dependent on the source/detector spacing and can be quantified by the beta coefficient of eqn (1). By adjusting the value of beta in the density correction of eqn (2), density sensitivity can be increased, decreased or removed altogether to attain a specific density response. The ability to tune the porosity response of the tool in this way makes it possible to deliver a response that is independent of the tool design. Thus, a consistent and uniform porosity response can be obtained from tools having intrinsically different responses.

The method of the invention has been described in reference to an LWD tool but provides equally effective density correction in wireline systems.

The invention claimed is:

1. A neutron measurement method for determining porosity of an earth formation surrounding a borehole comprising:
    conveying a tool along said borehole, wherein said tool comprises a source of neutron radiation and at least one detector axially spaced from said source;
    generating measured detector response for said at least one detector that is indicative of neutron radiation from said source interacting with said earth formations;
    operating said measured detector response with a predetermined mathematical equation and thereby obtaining corrected detector response that is independent of the density of said earth formation; and
    determining porosity of the earth formation surrounding the borehole from said corrected detector response.

2. The method according to claim 1, wherein said predetermined mathematical equation comprises multiplying the measured detector response by a correction factor that depends on the density of the formation.

3. The method of claim 2, wherein said at least one detector comprises a near detector and a far detector, wherein generating measured detector response comprises generating a measured near detector response and a measured far detector response, wherein obtaining corrected detector response comprises obtaining corrected near detector response and a corrected far detector response, and wherein said measured and corrected near detector responses comprise a near detector count rate, said measured and corrected far detector responses comprise a far detector count rate.

4. The method according to claim 3, wherein said predetermined mathematical equation is of the form:

$$CR_{corr} = CR \times e^{\beta \rho},$$

wherein $CR_{corr}$ is a corrected detector count rate, CR is a measured detector count rate, $\beta$ is a detector sensitivity to density and $\rho$ is a formation density.

5. The method according to claim 4, wherein the detector sensitivity to density β can be adjusted in order to provide a corrected detector response that is independent of the borehole tool design.

6. The method of claim 1, wherein the source of neutron radiation is an isotopic source that emits fast neutrons.

7. The method of claim 1, wherein said at least one detector comprises a near detector and a far detector, said near and far detectors being thermal neutron detectors.

8. The method of claim 1, wherein said at least one detector comprises a near detector and a far detector, said near and far detectors being epithermal neutron detectors.

9. The method of claim 1, wherein said tool is conveyed by means of a drill string.

10. A neutron measurement method for determining porosity of an earth formation surrounding a borehole comprising:
   conveying a tool along said borehole, wherein said toll comprises a source of neutron radiation and at least two detectors axially spaced from said source at different spacings;
   generating measured detectors responses for each said at least two detectors that are indicative of neutron radiation from said source interacting with said earth formations;
   selecting from said at least two detectors a pair of detectors comprising a near detector and a far detector, said near detector being placed closer to said neutron radiation source than said far detector,
   operating in said pair of near and far detectors at least one of the measured detector response with a predetermined mathematical equation and thereby obtaining corrected detector response that is independent of the density of said earth formation;
   forming a corrected ratio from said at least one corrected detector response and from said other detector response in said pair of near and far detectors; and
   determining porosity of the earth formation surrounding the borehole from said corrected ratio.

11. The method according to claim 10, wherein said predetermined mathematical equation comprises multiplying the measured detector response by a correction factor that depends of the density of the formation.

12. The method of claim 11, wherein said measured and corrected near detector responses comprise a near detector count rate, said measured and corrected far detector responses comprise a far detector count rate.

13. The method according to claim 12, wherein said mathematical equation is of the form:

$$CR_{corr}=CR \times e^{\beta \rho},$$

wherein $CR_{corr}$ is the corrected detector count rate, CR is the measured detector count rate, β is the detector sensitivity to density and ρ is the formation density.

14. The method according to claim 13, wherein the detector sensitivity to density β can be adjusted in order to provide a corrected detector response that is independent of the borehole tool design.

15. The method of claim 10, wherein both the measured near detector response and the measured far detector response are operated with the predetermined mathematical equation.

16. The method of claim 10, wherein the source of neutron radiation is an isotopic source that emits fast neutrons.

17. The method of claim 10, wherein said near and far detectors are thermal neutron detectors.

18. The method of claim 10, wherein said near and far detectors are epithermal neutron detectors.

19. The method of claim 10, wherein said tool is conveyed by means of a drill string.

20. A system for determining porosity of an earth formation surrounding a borehole comprising:
   (a) a borehole tool comprising a source of neutron radiation and at least one detector; and
   (b) a computer for computing measured response of said detector thereby obtaining a measure of the porosity of the earth formation surrounding the borehole, whereby:
   said measured response from said at least one detector is indicative of nuclear radiation from said source interacting with said earth formation;
   said measured response of said detector is operated with a predetermined mathematical equation using said computer to obtain corrected detector response that is independent of the density of the formation; said corrected detector response being indicative of the porosity of the earth formation surrounding the borehole.

21. A system according to claim 20, wherein said predetermined mathematical equation comprises multiplying the measured detector response by a correction factor that depends of the density of the formation.

22. A system according to claim 21, wherein said at least one detector comprises a near detector and a far detector, wherein said measure response comprises a measured near detector response and a measured far detector response, wherein said corrected detector response comprises a corrected near detector response and a corrected far detector response, and wherein said measured and corrected near detector responses comprise a near detector count rate, said measured and corrected far detector responses comprise a far detector count rate.

23. A system according to claim 22, wherein said predetermined mathematical equation is of the form:

$$CR_{corr}=CR \times e^{\beta \rho},$$

wherein $CR_{corr}$ is a corrected detector count rate, CR is a measured detector count rate, β is a detector sensitivity to density and ρ is a formation density.

24. A system according to claim 23, wherein the detector sensitivity to density β can be adjusted in order to provide a corrected detector response that is independent of the borehole tool design.

25. A system according to claim 20, wherein the source of neutron radiation is an isotopic source that emits fast neutrons.

26. A system according to claim 20, wherein said at least one detector comprises a near detector and a far detector, said near and far detectors being thermal neutron detectors.

27. A system according to claim 20, wherein said at least one detector comprises a near detector and a far detector, said near and far detectors being epithermal neutron detectors.

28. A system according to claim 20, wherein said tool is conveyed by means of a drill string.

29. A system for determining porosity of an earth formation surrounding a borehole comprising:
   (a) a borehole tool comprising a source of neutron radiation and at least two detectors axially spaced from said source at different spacings, said detectors comprising a near detector and a far detector, said near detector being placed closer to said neutron radiation source than said far detector, and (b) a computer for combining measured responses of said at least two detectors thereby obtaining a measure of the porosity of the earth formation surrounding the borehole, whereby:

said measured responses from said at least two detectors are indicative of nuclear radiation from said source interacting with said earth formation;

at least one of said measured responses of said detectors is operated with a predetermined mathematical equation using said computer to obtain corrected detector response that is independent of the density of the formation;

said corrected detector response and other detector response in said pair of near and far detectors are combined using said computer to form a corrected ratio; end said corrected ratio is indicative of the porosity of the earth formation surrounding the borehole.

30. A system according to 29, wherein said measured and corrected near detector responses comprise a near detector count rate, said measured and corrected far detector responses comprise a far detector count rate.

31. A system according to claim 30, wherein said mathematical equation is of the form:

$$CR_{corr} = CR \times e^{\beta \rho},$$

wherein $CR_{corr}$ is the corrected detector count rate, CR is the measured detector count rate, $\beta$ is the detector sensitivity to density and $\rho$ is the formation density.

32. A system according to claim 29, wherein both the measured near detector response and the measured far detector response are operated with the predetermined mathematical equation.

33. A system according to claim 29, wherein the source of neutron radiation is an isotopic source that emits fast neutrons.

34. A system according to claim 29, wherein said near and far detectors are epithermal neutron detectors.

35. A system according to claim 29, wherein said near and far detectors are thermal neutron detectors.

36. A system according to claim 29, wherein said tool is conveyed by means of a drill string.

* * * * *